United States Patent [19]
Carlson et al.

[11] Patent Number: 5,842,547
[45] Date of Patent: Dec. 1, 1998

[54] CONTROLLABLE BRAKE

[75] Inventors: J. David Carlson, Cary; Douglas F. LeRoy, Holly Springs, both of N.C.; John C. Holzheimer, Chagrin Falls, Ohio; Donald R. Prindle, Nort East; Robert H. Marjoram, Erie, both of Pa.

[73] Assignee: Lord Corporation, Cary, N.C.

[21] Appl. No.: 674,371

[22] Filed: Jul. 2, 1996

[51] Int. Cl.$^6$ .................................................. F16F 15/03
[52] U.S. Cl. .......................... 188/267; 192/21.5; 310/92
[58] Field of Search ................................. 188/267, 155, 188/290, 276, 161, 163, 164; 267/140.14; 192/21.5; 310/92, 93, 103, 105

[56] References Cited

U.S. PATENT DOCUMENTS

| | | | |
|---|---|---|---|
| 2,604,198 | 7/1952 | Stephenson | 192/21.5 |
| 2,605,876 | 8/1952 | Becker | 192/21.5 |
| 2,622,713 | 12/1952 | Rabinow | 192/21.5 |
| 2,629,471 | 2/1953 | Rabinow | 192/21.5 |
| 2,650,684 | 9/1953 | English et al. | 192/21.5 |
| 2,693,261 | 11/1954 | Winther | 192/21.5 |
| 2,886,151 | 5/1959 | Winslow | 192/21.5 |
| 3,266,606 | 8/1966 | Barrett | 192/21.5 |
| 3,305,055 | 2/1967 | Slaughter | 192/21.5 |
| 3,739,887 | 6/1973 | Ruget | 192/21.5 |
| 4,350,913 | 9/1982 | Eddens | 192/21.5 X |
| 4,856,631 | 8/1989 | Okamoto et al. | 192/21.5 |
| 4,967,887 | 11/1990 | Annacchino et al. | 192/21.5 |
| 5,007,513 | 4/1991 | Carlson | 192/21.5 |
| 5,178,582 | 1/1993 | Maji et al. | 188/267 X |
| 5,277,281 | 1/1994 | Carlson et al. | 188/267 |
| 5,284,330 | 2/1994 | Carlson et al. | 267/140.14 |
| 5,323,133 | 6/1994 | Heath et al. | 335/222 |
| 5,382,373 | 1/1995 | Carlson et al. | 252/62.55 |
| 5,398,917 | 3/1995 | Carlson et al. | 267/140.14 |
| 5,460,585 | 10/1995 | Gentry et al. | 482/1 |
| 5,492,312 | 2/1996 | Carlson | 267/140.14 |
| 5,598,908 | 2/1997 | York et al. | 192/21.5 |

OTHER PUBLICATIONS

Standard Specification for Soft Magnetic Iron Parts Fabricated by Powder Metallurgy Techniques; ASTM Designation: A 811–90; pp. 199–200, Jan. 1991.

Standard Specification for Phosphorous Iron Fabricated by Powder Metallurgy Techniques; ASTM Designation: A 839–87; pp. 205–210, Oct. 1987.

Standard Specification for Low–Carbon Magnetic Iron; ASTM Designation: A 848 –87; pp. 217–223, Nov. 1987.

"Compressed Powdered Iron" Metals Handbook, 9th Edition; vol. 3.

"Rheonetic Rotary Resistance System" Product Specification: Lord Ref. No. MRB–2107–3; 1996.

"Rheonetic Magnetic Fluid Systems" Lord Corporation Brochure No. PB8003; 1996.

Carlson, et al.; "Commercial Magneto–Rheological Fluid Devices" Lord Library of Technical Articles; Lord No. LL–8001.

*Primary Examiner*—Robert J. Oberleitner
*Assistant Examiner*—Pamela J. Lipka
*Attorney, Agent, or Firm*—Randall S. Wayland

[57] ABSTRACT

A controllable brake (20) including a rotor (28) supported by a shaft (30) which is rotatably supported by bushings (42) received in housing (22). A coil assembly (48) creates a magnetic field within a pole piece (32), which is preferably manufactured from a powdered metal material, which preferably has a density of between about 6.8 and 7.0 gm/cm. A magnetically-soft medium is contained within first and second gaps (86, 88) located between pole piece (32) and rotor (28). In one aspect, a magnetic saturation zone (25) reduces the propensity of magnetizing the shaft (30). In another, the pole halves (24, 26) are received in radially-spaced pole pockets (37) formed in the housing (22) and include an axial bias spring (70) to ensure intimate contact. In another aspect, a lip projection (76) traps fluid (23) between the lip projection (76) and shaft (30) and minimizes fluid exposure to the shaft seal (44). In another aspect, cooling fins (55) or a projection (53) restrains rotation of the housing (22). In another aspect, a spring (46) centers the rotor (28) relative to the housing (22).

24 Claims, 7 Drawing Sheets

CONTROLLABLE BRAKE

FIELD OF THE INVENTION

This invention relates to the area of controllable rotary acting devices. Specifically, the invention relates to the area of brakes for providing controllable torques and including a controllable magnetically-soft medium.

BACKGROUND OF THE INVENTION

Controllable devices generally include a controllable medium, such as an Electrorheological (ER) fluid, a Magnetorheological (MR) fluid, a ferrofluid, a dry magnetic particle material, or an electrophoretic material. Specifically, Magnetorheological (MR) fluid devices include a magnetorheological fluid, a medium which has magnetically-soft or paramagnetic particles suspended in a liquid carrier. MR dampers are known and include both rotary and linear acting varieties. Rotary devices can be used as brakes, clutches and the like, for providing variable torques while linear acting devices can be used for damping linear motion or for providing controllable dissipative forces along a specified axis.

MR devices have been found useful in a wide variety of applications. For example, MR dampers have been incorporated in vehicle engine mounts. One such device is taught in commonly assigned U.S. Pat. No. 5,398,917 to Carlson et al. In the mount, a rheological change of the MR fluid is used to control the engine motions by controlling the damping level therein. Other MR fluid devices are taught in the commonly assigned U.S. Pat. Nos. 5,284,330 and 5,277,281, both to Carlson et al., which describe axially-acting (linear) dampers and devices including sealless designs, respectively.

Copending applications Ser. No. 08/613,704 entitled "Portable Controllable Fluid Rehabilitation Devices" and Ser. No. 08/304,005 entitled "Magnetorheological Fluid Devices and Process of Controlling Force in Exercise Equipment Utilizing Same", both by Carlson et al., describe rotary dampers utilizing a controllable fluid for providing controllable forces in exercise machines and for portable devices for rehabilitation of injured limbs and the like.

Magnetically-controllable rotary dampers such as MR rotary dampers require highly magnetically permeable pole pieces for directing the magnetic flux across the working fluid gap(s) contained therein. In some cases there can be unwanted stray magnetic flux which can detract from the effectiveness of the damper. Stray or flanking flux paths can lead to a loss of efficiency because magnetic fields and associated field energy are developed where they are not needed or desired. This may cause remnant magnetism in any hard-magnetizable component present in the brake. This remnant magnetism can attract the magnetically-soft medium into areas where it may be undesirable to have it, for example, adjacent to the shaft seals. Constant exposure to a magnetically-soft medium, such as MR fluid, may cause premature failure of the shaft seals. Because of this stray flux, prior art shafts have been preferably made of a nonmagnetic material. Notably, nonmagnetic shaft materials tend to be relatively expensive, thereby increasing the cost of the brake. Furthermore, prior art pole pieces have tended to be heavy and expensive in that they must be carefully designed to eliminate magnetic flux pinch or saturation points. Prior art pole piece materials have included wrought free-machining steels.

Furthermore, under conditions of continued use, the prior art brakes have experienced heat buildup problems. This leads to break down of the fluids and premature failure of the shaft seals. Therefore, there is a recognized need for a method and means for reducing wear of the seals in MR fluid brakes and for reducing the cost and weight of the pole pieces. In addition, smaller and more powerful brakes are always desired.

SUMMARY OF THE INVENTION

Therefore, given the benefits and drawbacks of the prior art controllable brakes including a magnetically-soft medium, the present invention is directed to a rotary brake which solves the seal wear, weight and cost problems associated with the prior art and also improves performance. In one aspect thereof, the brake includes powdered metal pole pieces. Initially, the use of powdered metal in the pole pieces was thought to be prohibitive because the brake would have to be made much thicker (physically larger) to accommodate the generally lower saturation magnetism of powdered metals. This is because of the fact that powdered metals are much less dense than wrought steel or Cold Rolled Steel (CRS) used in prior art pole pieces. It was thought by the inventors that to prevent magnetic saturation of the pole piece, the pole piece would have to be made as much as 30%–40% larger. Notably, no weight savings or performance increase was expected. However, the inventors discovered that because of the specific portion of the B/H curve which is operated upon for the present invention brake, the pole piece could be made the same size as the prior art wrought steel or Cold Rolled Steel (CRS) pole pieces. Furthermore, unexpectedly, the weight of the brake was reduced and the performance (torque rating) was increased.

In another aspect, preferably ring-like pole pieces are received within a pocket in a preferably non-magnetic housing and preferably includes cooling means formed radially or vertically thereon. The present invention brake minimizes the stray magnetic fields present in prior art devices and because the shaft is supported by a portion of the housing with low magnetic field density thereabouts, the shaft can be manufactured from a magnetic martensitic material, which reduces cost.

In another aspect, where the outer housing is manufactured entirely from powdered metal, a nonmagnetic bushing and/or a magnetic saturation zone acts as the mechanism to limit the exposure of the shaft to any stray magnetic fields. In yet another aspect, a noncontacting lip projection adjacent to the shaft seal causes any stray magnetic field present to be localized and attract the magnetically-soft medium between the shaft and lip projection, thereby preventing or minimizing the magnetically-soft medium from reaching the seal.

It is an unexpected advantage of the present invention that despite the use of powdered metal for the pole pieces, the size of the pole pieces, and thereby the size of the brake, unexpectedly does not have to be increased.

It is an unexpected advantage of the present invention that the brake is lighter than prior art brakes using wrought steel pole pieces.

It is an advantage of the present invention that the brake is less costly than prior art brakes using wrought steel pole pieces.

It is an advantage of the present invention that the brake may run cooler than prior art brakes thereby providing longer life of the fluid when an MR fluid is used.

It is an unexpected advantage of the present invention that the brake including powdered metal pole pieces performs better than prior art wrought brakes of the same size, in that they can develop larger braking torques, have lower off states and can switch quicker.

It is an advantage of the present invention that the seals in the brake will last longer as a result of less exposure to the abrasive magnetically-soft medium.

The abovementioned and further aspects, features and advantages of the present invention will become apparent from the accompanying descriptions of the preferred embodiments and attached drawings.

BRIEF DESCRIPTION OF THE DRAWINGS

The accompanying drawings which form a part of the specification, illustrate several embodiments of the present invention. The drawings and description together, serve to fully explain the invention. In the drawings.

DETAILED DESCRIPTION OF THE INVENTION

Figure 2A:
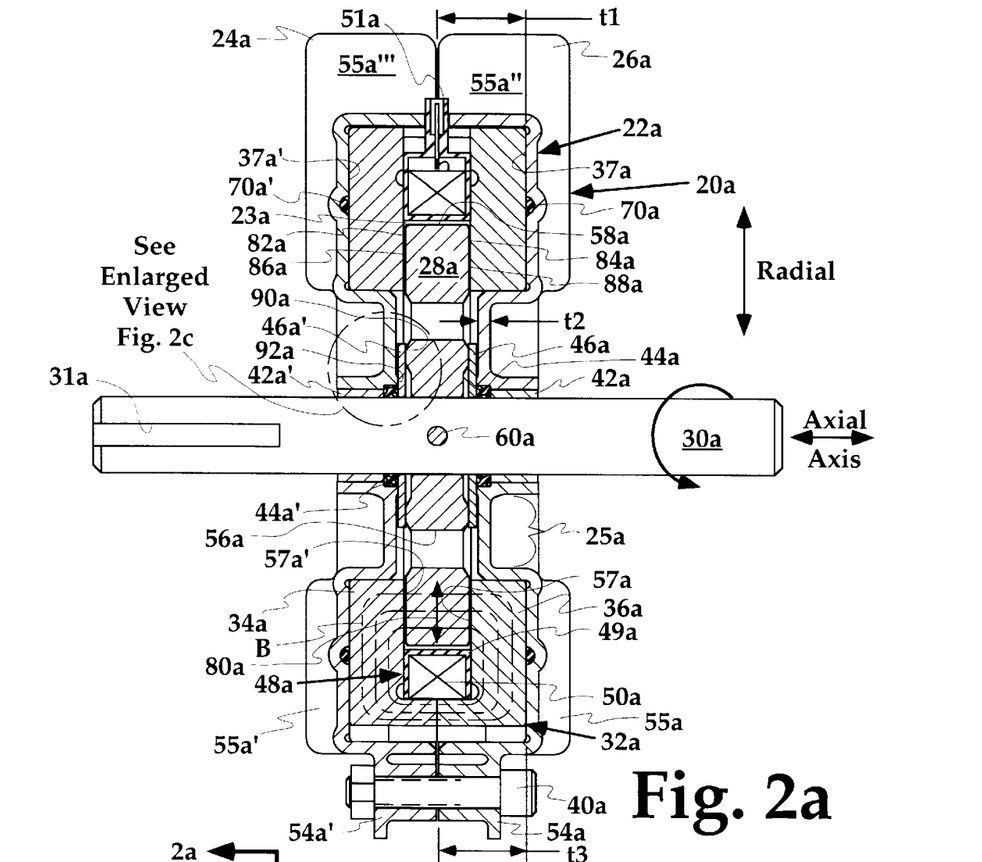
FIG. 2a is a partially cross-sectioned side view of a first embodiment of the present invention rotary brake including cooling fins, a preferably nonmagnetic housing supporting the shaft with pole pieces received within a pocket formed in the nonmagnetic housing that are spaced away from the shaft.

With reference to the various figures herein, where like reference characters are employed where possible to indicate like components, there is shown in FIG. 2a a rotary-acting controllable brake which in this description is a magnetorheological (MR) fluid brake 20a. It should be understood that the various aspects of the present invention are described with reference to a MR fluid brake 20a, however, the inventors indicate and expect the various aspects of the invention would have equal applicability to any controllable brake device that includes a magnetically-soft medium, for example, in a dry powdered metal particle brake or coupling.

The first embodiment of MR fluid brake 20a comprises a housing 22a, preferably having substantially identical first and second halves 24a and 26a, preferably disc-shaped rotor 28a, a rotatable shaft 30a preferably manufactured from a magnetically soft material which has an optional key slot 31a formed therein, a magnetically-soft yoke 32a preferably having substantially identical first and second pole piece halves 34a and 36a, bushings 42a and 42a' which are preferably porous, impregnated, and nonmagnetic and which radially support the shaft, elastomer seals 44a and 44a', preferably of the elastomer quad-ring variety, disc-like springs 46a and 46a' for centering the rotor 28a, a coil assembly 48a for generating a changeable magnetic field which includes a nylon bobbin 49a and multiple hoop wound wire coils 50a, an electrical connector 51a and fasteners 40a.

In more detail, the housing halves 24a and 26a may be manufactured from wrought steel, stamped steel, cast or machined aluminum, aluminum alloys or the like. Most preferable materials are cast aluminum or a zinc/aluminum alloy. Each half 24a and 26a preferably has a pole pocket 37a and 37a' formed therein and spaced radially outward from the shaft axis. The pockets 37a and 37a' are formed near its outermost radial portion for receiving ring-like pole piece halves 34a and 36a of the magnetically-soft yoke 32a therein. The inventors recognized that it is desirable to distance the magnetically-soft yoke 32a away from the shaft 30a. They determined that this minimizes the stray magnetic field/flux developed in the area adjacent the shaft 30a and minimizes magnetization of the shaft 30a. Magnetization of the shaft 30a or the components near the shaft 30a is undesirable as it will cause MR fluid 23a to be attracted to the magnetized areas near the shaft seals 44a and 44a' causing undesirable wear thereof. Spacing the magnetically-soft yoke 32a away from the shaft 30a prevents or minimizes magnetic stray magnetic field buildup in the area adjacent to the shaft 30a.

If aluminum or other nonmagnetic material is used, then that in combination with spacing the magnetically-soft yoke 32a radially outward from the shaft acts as a means for limiting the magnetic field at or near the shaft seals. Likewise, if steel or other like magnetic material is used for the housing, the magnetic flux saturation zone 25a having a thickness t2 in combination with spacing the magnetically-soft yoke 32a radially outward from the shaft limits the amount of stray magnetic field present in areas adjacent the shaft 30a. The housing 22a performs the functions of supporting the shaft 30a and creating a portion of the fluid containment. Housing 22a also includes projecting flange portions 54a and 54a', preferably of which there are three or four pair, which are equally spaced and which are bolted together via fasteners 40a, such as with socket-head cap screw and nut shown, to secure the assembly together. The housing 22a also includes means to prevent rotation of the pole piece halves 34a and 36a relative to each other and relative to the housing halves 24a and 26a. One such means (a nub and receiving groove) preventing rotation is described with reference to FIG. 4. Further, the fasteners 40a could interact with localized cutouts or recesses formed in the radial outer periphery of pole pieces to restrain rotation thereof.

It was also discovered by the inventors that, under certain conditions, the axial dimension t1 of the pole piece halves 34a and 36a and the axial dimension t3 from the bottom of the pole pockets, e.g. 37a to the edge of the flanges 54a can lead to a situation where the pole piece halves 34a and 36a do not touch each other at their inside edges (contacting interface). This can dramatically affect the performance of the MR brake 20a. This is because if an axial gap is present at the juncture between the halves, it acts as a magnetic reluctance, reducing the flux density of the magnetic field within the magnetically-soft yoke 32a. The axial gap at the contacting interface of the pole halves 34a and 36a is caused by tolerance stackups, i.e., when the dimensions of the pole piece halves 34a and 36a, i.e., t2 are at the low end of their tolerance range and the pole pocket bottom-to-flange dimension, i.e., t3, is at the high end of its tolerance range. To solve this problem, the inventors have added axial spring bias means to force the two pole halves 34a and 36a together and into intimate contact upon assembly thereof. Generally it is also desirable to make t3 less than t1. This eliminates the possibility of any axial gap occurring at the contact interface between the two halves 34a and 36a. In this embodiment, the axial spring bias is achieved by means of compressing bias springs 70a and 70a', which are preferably elastomer o-rings. The o-rings described herein perform the dual function of: 1) sealing the interface between the pole halves 34a and 36a and the housing halves 24a and 26a, and 2) axial spring biasing the pole pieces 34a and 36a together. O-rings may be used adjacent the coil 48a to ensure sealing therearound also.

The portion of the housing 22a in contact with the magnetically-soft yoke 32a is preferably thin in cross-section and preferably includes cooling fins 55a, 55a', 55a", and 55a''' located in the vicinity thereof to help dissipate the heat generated by continuous or semi-continuous rotation of the MR brake 20a. Furthermore, it is preferable to use a highly-thermally conductive and nonmagnetic material such as aluminum or copper. The cooling fins 55a, 55a', 55a", and 55a''' are preferably arranged such that they extend in a generally radial direction and preferably in a starburst pattern or straight across (vertical) pattern as will be described with reference to FIG. 5a and FIG. 5b. Preferably, the cooling fins 55a, 55a', 55a", and 55a''' extend both axially and radially away from the pole piece halves 34a and 36a.

The pole piece halves 34a and 36a of magnetically-soft yoke 32a are adapted for side-by-side axial assembly and preferably each has a ring-like shape and has an L-shaped cross-section at each cross-section cut (on either side of the center-line). The magnetically-soft yoke 32a comprising pole piece halves 34a and 36a in this, and all embodiments, are preferably manufactured from a powdered metal material having a high magnetic permeability and a density range of between about 6.4 gm/cm3 and about 7.2 gm/cm3. A more preferable range is between about 6.8 gm/cm3 to about 7.0 gm/cm3. Although, powdered metal materials are available in lower densities, it was determined by the inventors that going below 6.8 gm/cm3 is not desired, in most cases, because the low density will make the size of the device larger. Further going above 7.0 gm/cm3 adds to the cost substantially. The powdered metal material is preferably selected from the group consisting of pure iron, low carbon irons, and iron with added phosphorus. Notably, it is preferable that the pole piece halve materials and other flux carrying elements are annealed per the heat treat recommendation outlined in the appendix of ASTM A848 to further increase permeability and lower sulfur, nitrogen and oxygen content. Most importantly, the materials used should have low carbon content.

Each pole piece half 34a and 36a has a recess 57a and 57a' formed therein, which together interact to form the recess which receives the working portion 80a of the rotor 28a. Receiving rotor 28a in the recess creates the first and second gaps 86a and 88a adjacent the working surface 80a which contain a sufficient volume of the MR fluid 23a therein. By way of example, and not to be considered limiting, the preferable MR fluid 23a for this embodiment, as for all embodiments described herein, includes small, preferably spherical, magnetically-soft particles, such as magnetite, carbonyl iron, iron alloys, iron nitrides, iron carbides, chromium dioxide, low carbon steel, silicon steel, nickel, cobalt or the like, having a nominal diameter of between about 1 and about 6 microns which are disbursed and suspended in a preferably low-viscosity liquid such as silicone oil, hydrocarbon oil, paraffin oil, mineral oil, chlorinated fluid, fluorinated fluid, kerosene, glycol, water or the like.

Figure 1A:
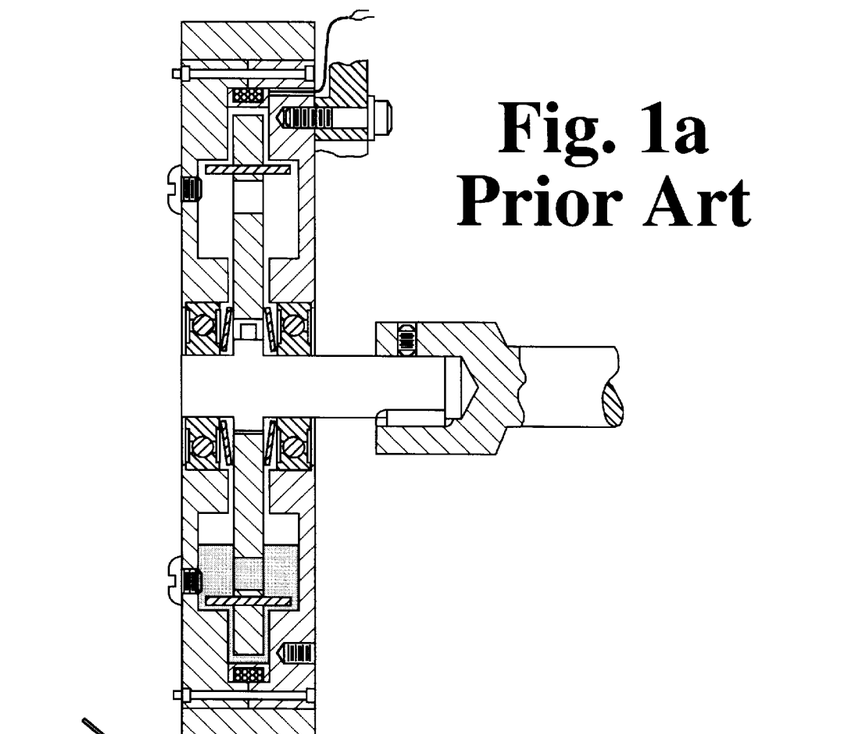
FIG. 1a and FIG. 1b are partially cross-sectioned side views of prior art MR fluid brakes sold by LORD Corporation.
Figure 1B:
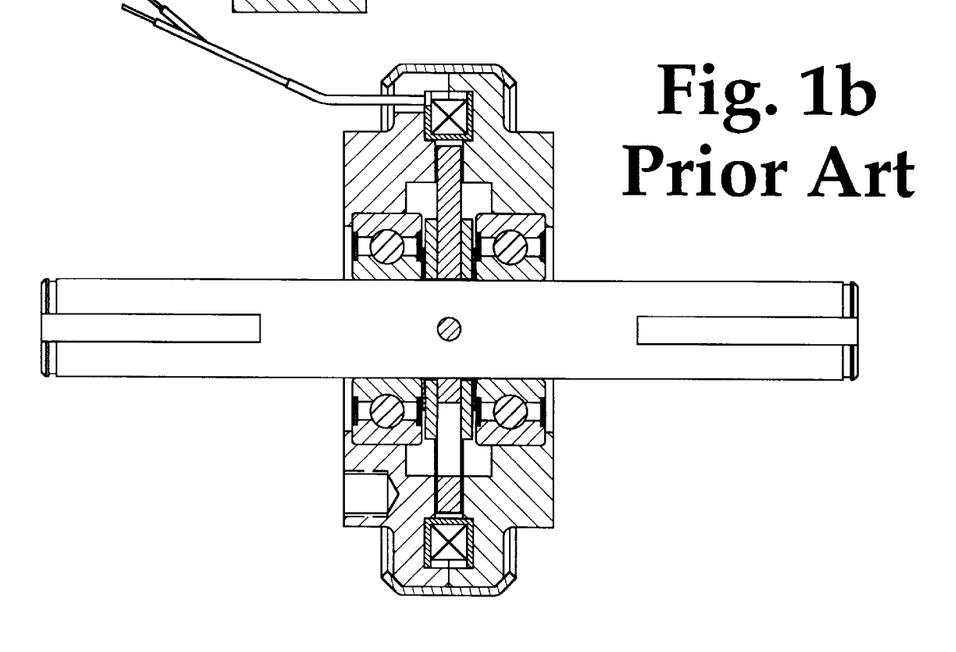

The rotor 28a includes first and second rotor surfaces 82a and 84a, working portion 80a, and an outer periphery 58a. Preferably, the rotor 28a is disc-like and the plane of the rotor surfaces 82a and 84a is substantially perpendicular to the axial axis of the shaft 30a, thereby first and second surfaces 82a and 84a are preferably parallel. The rotatable shaft 30a also preferably includes means for restraining rotation thereon, such as an optional key slot 31a, for preventing rotation relative to the coupling device/component the MR brake 20a is attached to. The working portion 80a of the rotor 28a is received within a cutout or recess 57a and 57a' preferably formed in each half 34a and 36a. The working portion 80a comprise a portion of the magnetic circuit in that the lines of flux B act through the working portion 80a of the rotor 28a. The rotor 28a is preferably manufactured from a PM material also. Although, the inventors had used PM for the rotors of prior art brakes, such as shown in FIG. 1a and FIG. 1b, it was not recognized that the magnetically-soft yoke 32a could be made from PM materials without a significant increase in its size. This is because the rotor is seldom a pinch point in the magnetic circuit. The pinch points (saturation points having high flux density or high B) are generally always located in the magnetically-soft yoke 32a. Generally this is because in disc-like rotors, the lines of flux act across the working section 80a of the rotor 28a. The flux density in the rotor 28a is approximately the same as in the first and second gaps 86a and 88a.

The means for generating the changeable magnetic field is preferably comprised of a coil assembly 48a further comprising a preferably nonmagnetic or nylon bobbin 49a and multiple hoop wound and insulated copper magnet wire 50a, by way of example and not to be considered limiting, between about 170 winds and about 250 winds. The coil assembly 48a is received in the recesses 57a and 57a' at the outermost portion thereof and at a position adjacent to the outer periphery 58a of the rotor 28a. The coil assembly 48a generates a changeable magnetic field within the magnetically-soft yoke 32a and, therefore, also in the gaps 86a and 88a, upon being electrically energized with DC current. An estimate of the magnetic flux lines are generally shown as B. The lines of flux preferably act perpendicularly across the first and second gaps 86a and 88a. The exposure to the magnetic field causes a change in rheology, i.e., the particles within the MR fluid 23a which become polarized and align into chains acting across the first and second gaps 86a and 88a. This rheology change causes an increase in torsional resistance between the housing 22a and rotor 28a at the working section 80a thereof, with the resulting increased resistance to torsional rotation of the shaft 30a relative to the housing 22a. This provides the controllable resistance in the system which the MR brake 20a is used, which for the embodiments described herein, can range up to about 220 in.-lb. of torque output.

The inner seal preventing escape of the MR fluid 23a between the pole pieces 34a and 36a is preferably comprised of the flexible nylon bobbin 49a itself or in combination with an RTV sealant. Most preferably, an o-ring seal is used to provide a positive seal even with worst-case tolerance stackup conditions. As discussed earlier, the spring bias 70a and 70a' provides an outer seal between the pole piece halves 34a and 36a and the housing halves 24a and 26a. Shaft seals 44a and 44a' seal against the shaft 30a.

The rod-like shaft 30a is preferably manufactured from a magnetic material such as CRS and is preferably radially supported by nonmagnetic bushings 42a and 42a'. Bushings 42a and 42a' are preferably manufactured from a nonmagnetic material. By way of example and not to be considered limiting, porous bronze, or the like which is preferably impregnated with a friction reducing material, such as grease, oil, perfluoronated polyethelene, or the like may be used. Alternatively plastic could be used. It was discovered by the inventors herein that making the bushing 42a and 42a' out of a nonmagnetic material helps considerably in reducing the stray magnetic flux exposed to the shaft 30a.

Figures 2B, 2C:
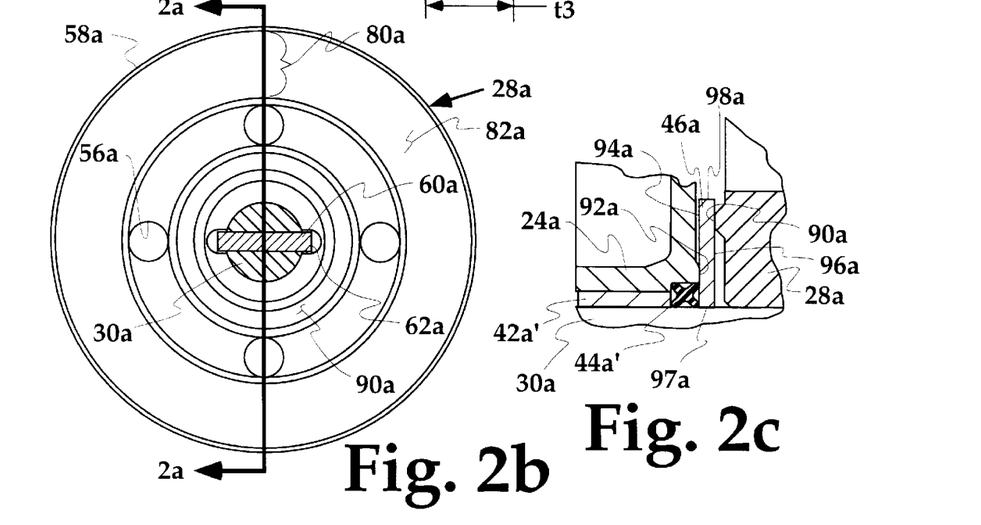
FIG. 2b is a partially cross-sectioned side view of the rotor and shaft assembly.
FIG. 2c is a partially cross-sectioned and enlarged side view of the spring assembly between rotor and housing.

As shown in FIG. 2b and FIG. 2c, the rotor 28a attaches and interconnects to the shaft 30a by way of pin 60a inserted crosswise through shaft 30a and which is received in at least one slot 62a formed radially into the rotor 28a. This restrains relative torsional rotation between the shaft and rotor 28a. Notably, the rotor 28a may still move axially a certain amount relative to the shaft 30a as far as allowed before springs 46a and 46a' (FIG. 2a) and pin 60a make contact. Adjacent to the ends of the bushings 42a (FIG. 2a) and 42a' are elastomer shaft seals 44a and 44a' of the elastomer quad-ring variety. Preferably, the seals 44a (FIG. 2a) and 44a' are molded from an approximately 60–90 durometer fluorocarbon elastomer and more preferably from an about 75 durometer fluorocarbon elastomer material. Bushings 42a (FIG. 2a) and 42a' and seals 44a (FIG. 2a) and 44a' are retained in appropriately sized bushing and seal glands formed in each of housing halves 24a and 26a (FIG. 2a).

FIG. 2c illustrates an enlarged view of one side of a spring assembly which functions to center the rotor 28a and maintain the dimensions of first and second gaps 86a and 88a (FIG. 2a) at approximately equal thickness of, by way of example and not to be considered limiting, approximately 0.01–0.025 inch. In this view, the spring 46a, which is preferably a disc-spring, flexibly suspends the rotor 28a along the axial axis of the shaft 30a and maintains the axial position of the rotor 28a relative to the housing 22a (FIG. 2a). The spring 46a is preferably washer-like and is flexible and preferably manufactured from a flexible material, such as thin spring steel, or nylon. The spring 46a includes first and second faces 94a and 96a, an inner diameter 97a and an outer diameter 98a. Rotor projection 90a and housing projections 92a contact the spring 46a on faces 94a and 96a. Preferably, during assembly, springs 46a and 46a' (FIG. 2a) are flexed slightly, for example, inner diameter 97a axially relative to outer diameter 98a. This functions to properly align and center the rotor 28a relative to the housing 22a.

Figure 3A:
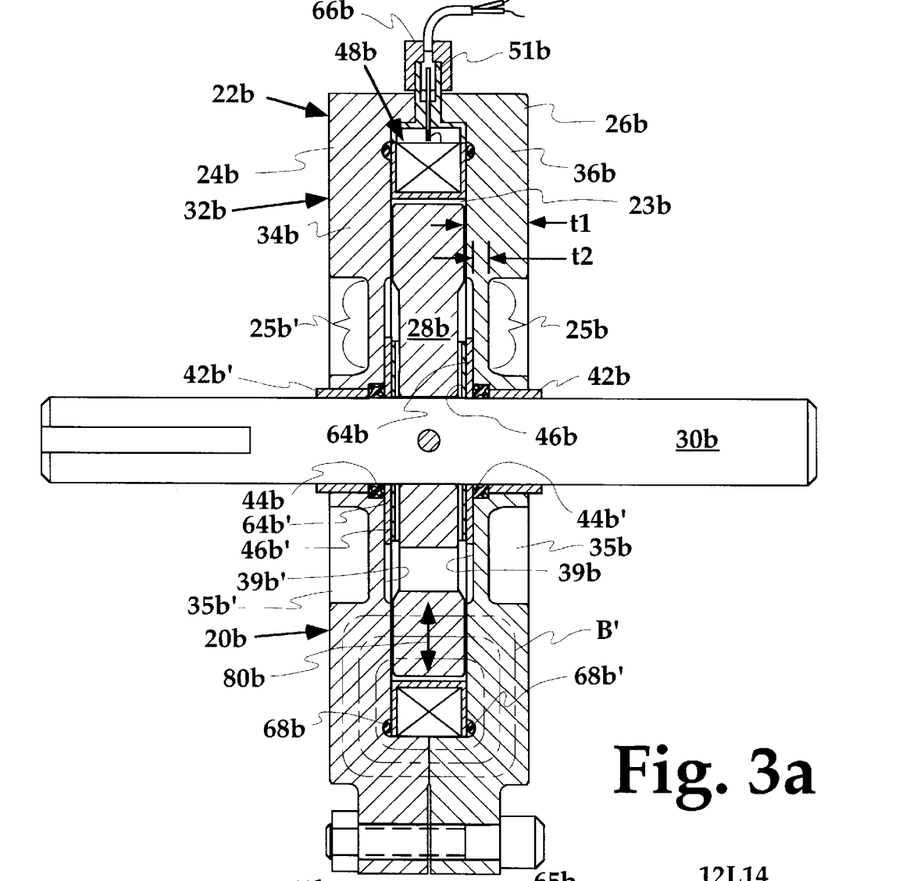
FIG. 3a is a partially cross-sectioned side view of another embodiment of the present invention controllable brake including a powdered metal housing which preferably includes a magnetic saturation zone.

FIG. 3a illustrates another embodiment of magnetorheological (MR) fluid brake 20b, including a housing 22b and magnetically-soft yoke 32b combination where each pole piece half 24b and 26b is preferably entirely manufactured from a powdered metal material such as a magnetically-soft Powdered Iron Metal per ASTM A811 or Powdered Phosphorus Iron per ASTM A839. The housing 22b and magnetically-soft yoke 32b combination is preferably manufactured from substantially identical halves 24b and 26b. Each half 24b and 26b preferably includes pole piece halves 34b and 36b, relief pockets 39b and 39b' and magnetic saturation zones 25b and 25b'. The relief pockets 39b and 39b' help focus the magnetic field across the rotor 28b as well as reduce the viscous drag on the portion of rotor 28b away from the working portion 80b. The magnetic saturation zone 25b is generally a cored-out section which significantly reduces the cross-sectional area of the housing 22b in the area adjacent the shaft 30b, thus, it acts as a pinch or saturation point to limit the magnitude of the stray magnetic field present therein. This prevents any strong magnetic field from being generated in the area adjacent to the shaft seals 44b and 44b'. The inventors discovered it is desirable to reduce the thickness t2 in the magnetic saturation zone 25b to the smallest dimension possible, yet retaining sufficient strength to carry the torsional loads. Specifically, the dimension t2 should be made less than $\frac{1}{3}$ and more preferably less than $\frac{1}{4}$ of t1 to limit the degree of remnant magnetization of the shaft 30b. Radial directed webs 35b and 35b' may be optionally included to add strength in the cored-out area. The webs 35b and 35b' (see similar webs in FIG. 5a) should preferably be as thin as practicable. Unexpectedly, even the use of thin nonmagnetic bushings also has a dramatic effect on reducing the level of stray magnetic flux exposed to the shaft 30b.

Bushings 42b and 42b' which are preferably thin, nonmagnetic and porous and lubricated bronze, radially support the shaft 30b at housing halves 24b and 26b. With the use of the magnetic saturation zone 25b, the shaft 30b may be made of a less expensive magnetic martensitic material such as cold rolled steel or the like in place of more expensive nonmagnetic stainless steels. In a similar manner as the FIG. 2a embodiment, coil assembly 48b functions as the means for generating the changeable magnetic field B' within the magnetically-soft yoke 32b and within pole piece halves 34b and 36b and, thus, within gaps 86a and 88a. In this embodiment, the springs 46b and 46b' that center the rotor 28b are wave-type springs, or the like. It should be understood that other springs could be used, for example, helical springs, conical springs, volute springs, Belleville springs, slotted washer springs, curved washer springs, and finger washer springs, or the like.

End washers 64b and 64b' are preferably manufactured from nylon or spring steel and serve the dual purposes of: 1) providing a lateral race for the shaft seals 44b and 44b' to act against, and 2) to provide a smooth surface for the springs 64b and 64b' to act against. Optional seals 68b and 68b' are preferably used to seal the escape of MR fluid 23b. Connector 51b, lead 66b, and coil assembly 48b comprise a portion of the electrical circuit. Generally, the MR brakes described herein are DC devices. A further description of the electrical circuitry needed to control such MR brake devices can be found in commonly assigned U.S. patent application Ser. No. 08/613,704 to Carlson, filed Mar. 11, 1996 and entitled "Portable Controllable Fluid Rehabilitation Devices", which is hereby incorporated by reference herein.

Figure 3B:
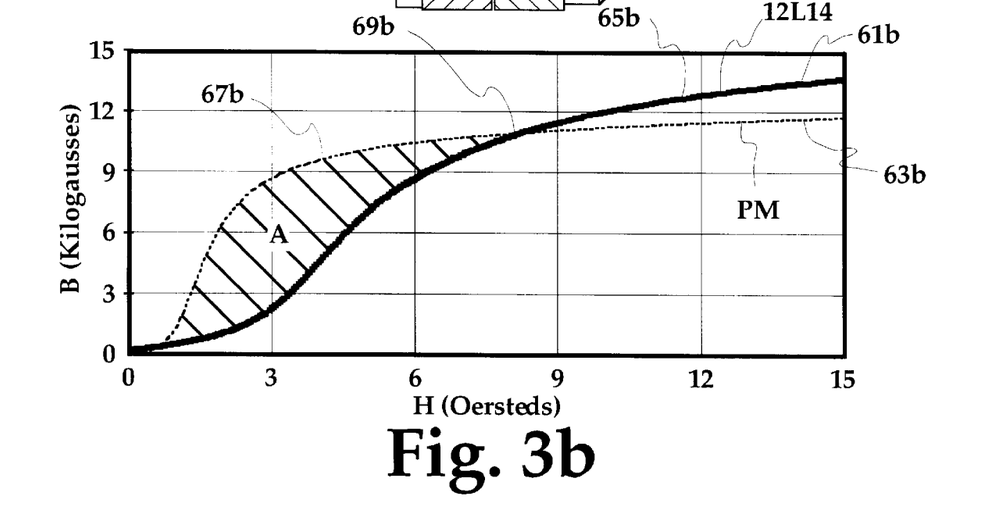
FIG. 3b is a graphical illustration of the B/H curves for the prior art (AISI 12L14) and powdered metal pole piece materials of the present invention.

FIG. 3b illustrates the B/H curve for materials compared in the magnetorheological (MR) fluid brake 20b. B stands for the magnetic flux density in tesla and H stands for the magnetic field in amp/meter. Curve 1 designated 61b illustrates the B/H curve for a free machining steel (12L14) whereas Curve 2 designated 63b illustrates the B/H curve for a 6.9 gm/cm3 density pure iron, powdered-metal material. Curve 1 has a knee 1 designated by 65b and curve 2 has a knee designated by 67b. Generally, the inventors recognize it is desirable to operate below the knee in any B/H curve, i.e., below saturation or at a lower applied magnetic field. As discovered by the inventors herein and as represented by the shaded area A, the use of powdered metal material for the poles will generate a significantly higher flux density for any current density below the knee in the curve. Therefore, translating into more torque resistance for any coil amperage provided to the MR brake 20b. This is true up to the cross over point 69b. Furthermore, use of powdered metal improves switching speed and provides less remnant magnetization of the magnetically-soft yoke 32b providing a lower off-state.

Figure 4:
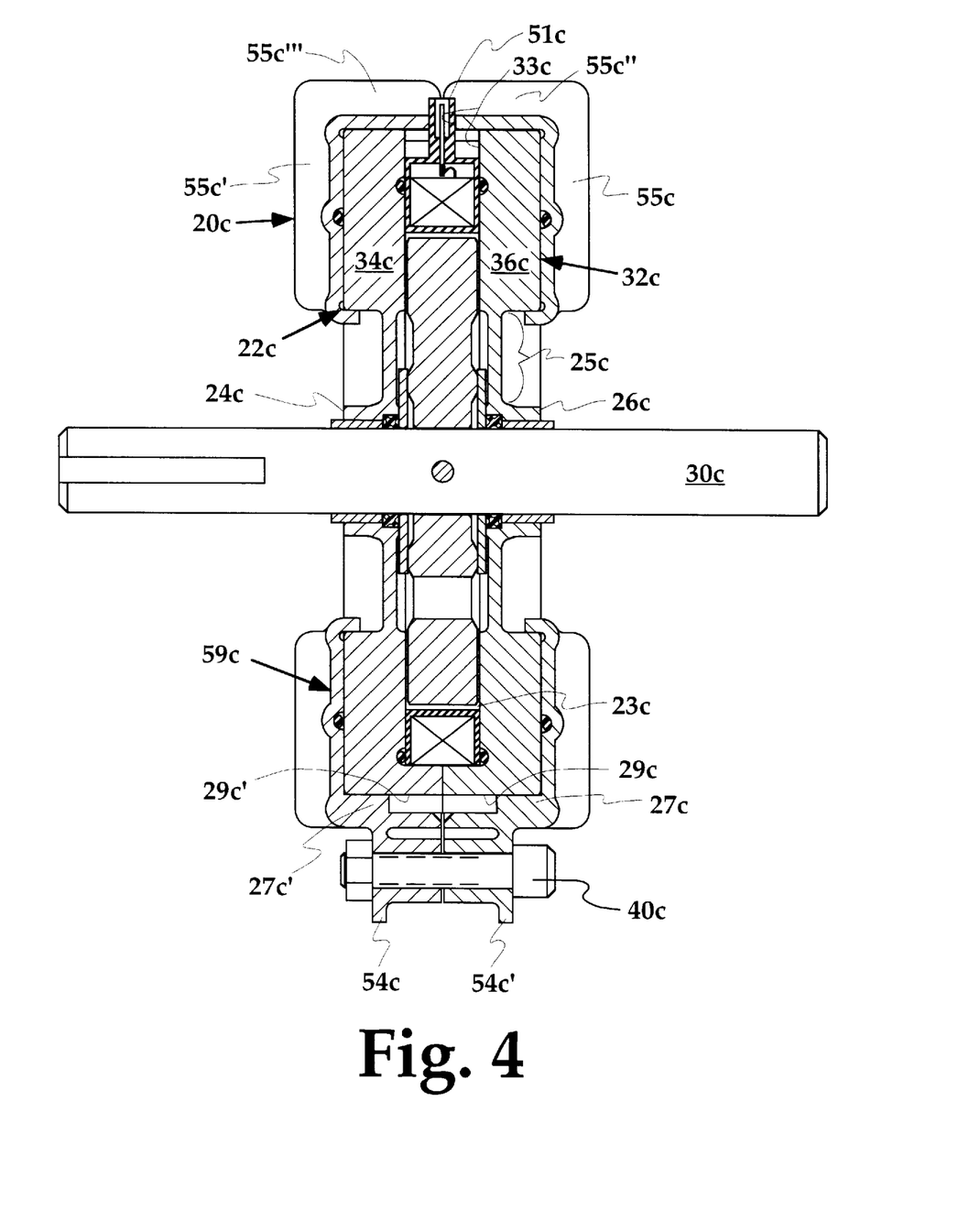
FIG. 4 is a partially cross-sectioned side view of another embodiment of the present invention controllable brake with a preferably thermally conductive clamping assembly and including a pole piece and housing combination.

FIG. 4 illustrates another embodiment of the magnetorheological (MR) fluid brake 20c. In this embodiment, the magnetically-soft yoke 32c and housing 22c combination is preferably powdered metal material and includes pole piece halves 34c and 36c. The magnetically-soft yoke 32c carries the magnetic circuit and is integral with the housing 22c. The housing 22c supports the shaft 30c and forms the containment for the MR fluid 23c. Cooling fins 55c, 55c', 55c'', and 55c''' extend axially and radially away from the pole piece halves 34c and 36c and are included in a clamp assembly 59c. Halves or the clamp assembly 59c are secured together at projecting flange portions 54c and 54c' with fasteners 40c which secures housing halves 24c and 26c together. Nubs 27c and 27c' on clamp assembly 59c are received in grooves 29c and 29c' formed in pole piece halves 34c and 36c to prevent rotation of the pole piece halves 34c and 36c relative to the clamp assembly 59c. The electrical connector 51c is received in connector hole 33c, which is a hole through the magnetically-soft yoke 32c and clamp assembly at a single location on the periphery of the MR brake 20c.

Figure 5A:
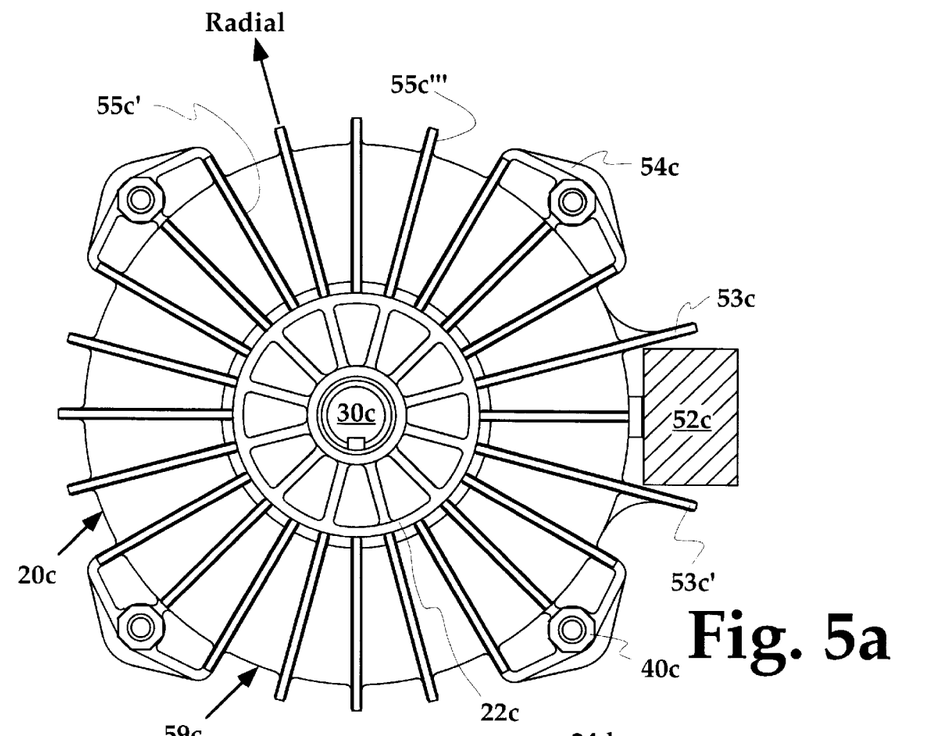
FIG. 5a is a frontal view of the FIG. 4 embodiment of the present invention rotary controllable fluid brake illustrating a radial starburst cooling fin pattern which uses at least one of the cooling fins as the means for restraining rotation of the housing.
Figure 5B:
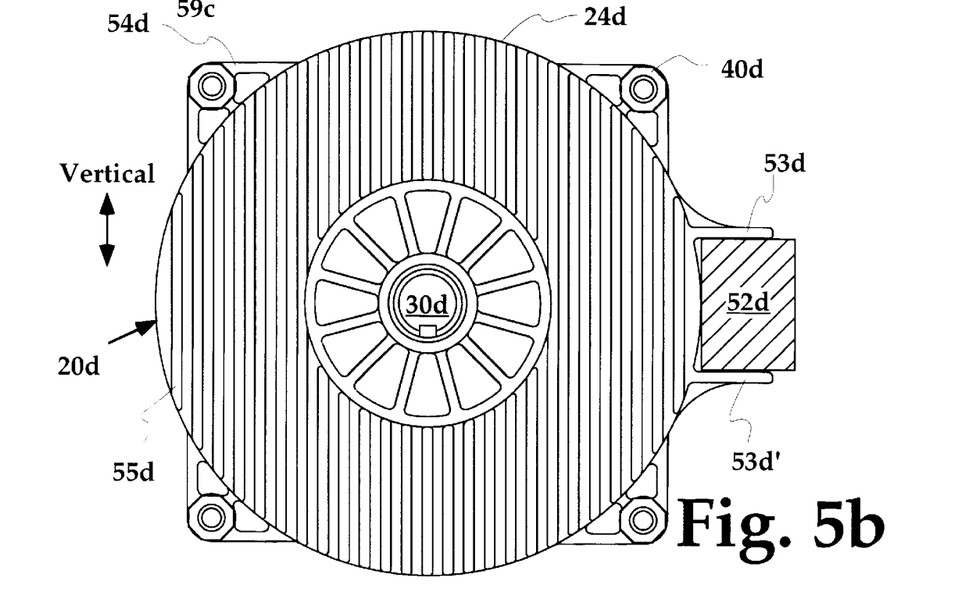
FIG. 5b is a frontal view of another embodiment of the present invention rotary controllable brake illustrating a vertical cooling fin pattern which uses a projection from the housing as the means for restraining rotation.

FIG. 5a and FIG. 5b illustrates embodiments of magnetorheological (MR) fluid brakes 20c and 20d, respectfully. The FIG. 5a embodiment includes cooling fins 55c' which extend in the axial direction away from the pole piece 32c (FIG. 4) and cooling fin 55c''' which extends in the axial direction from the magnetically-soft yoke 32c (FIG. 4). The clamp assembly 59c is preferably manufactured from a material with good thermal conductivity such as aluminum, and functions to hold the pole piece halves 34c and 36c (FIG. 4) together and as a heat sink to efficiently carry the heat away from the magnetically-soft yoke 32c.

Figure 6A:
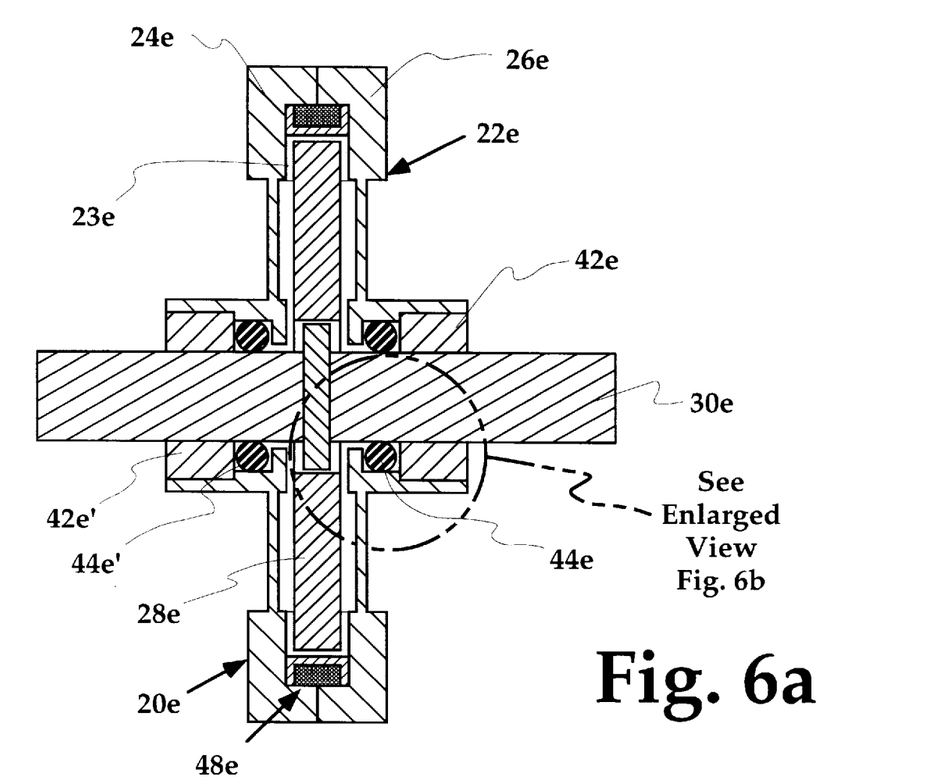
FIG. 6a is a cross-sectioned side view of another embodiment of the present invention rotary controllable brake including localized stray field directing means adjacent to the shaft for suspending the magnetically-soft medium therebetween and minimizing the amount of magnetically-soft medium reaching the shaft seal.
Figure 6B:
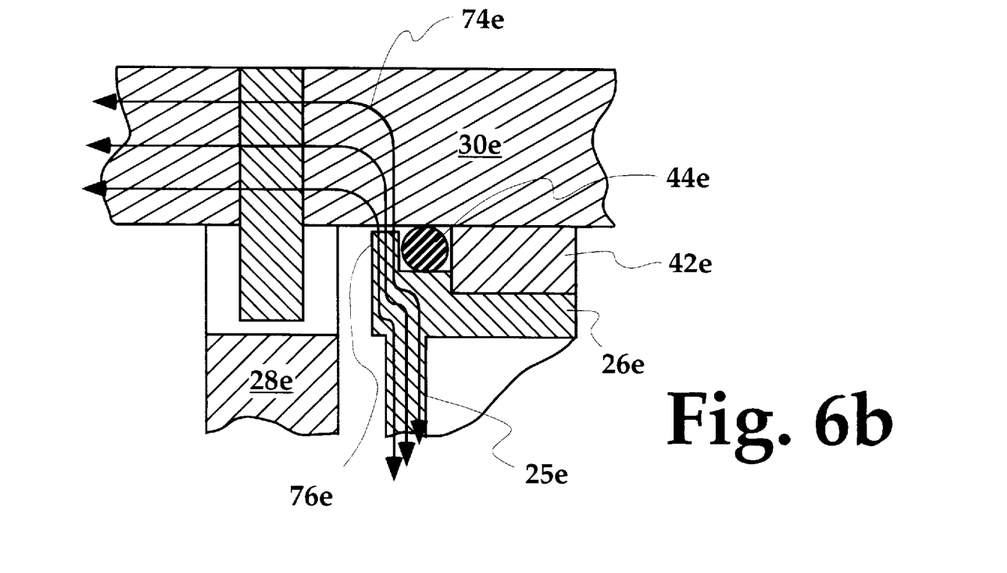
FIG. 6b is an enlarged cross-sectioned side view of a portion of the FIG. 6a embodiment.

FIG. 6a and FIG. 6b illustrate another embodiment of the magnetorheological (MR) fluid brake 20e. This embodiment includes a housing 22e including first and second halves 24e and 26e, a rotor 28e, a coil assembly 48e, a shaft supported by bushings 42e and 42e', and shaft seals 44e and 44e'. In another novel aspect of the invention, stray field projecting means such as noncontacting lip projection 76e are used to direct any stray magnetic flux 74e. The lip projection 76e, which is preferably an integral part of the housing halves 24e and 26e, directs any stray magnetic flux 74e down through the lip projection 76e and into the shaft 30e. This causes a magnetically-soft medium, such as MR fluid 23e, to be attracted locally to that area, and puddle thereat. This builds a barrier to further migration of the MR fluid 23e past the barrier and into the vicinity of seal 44e and 44e'. Therefore, it is surmised by the inventors that less exposure to MR fluid 23e, and the abrasive particles therein, will reduce the seal wear and prolong the useful life thereof.

Figure 7A:
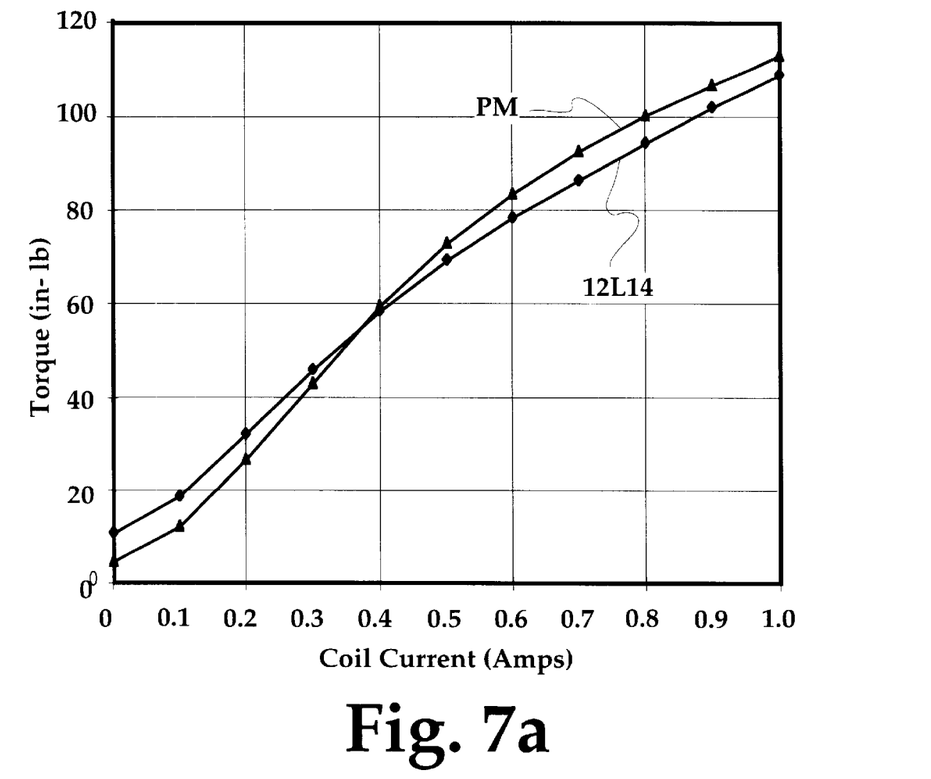
FIG. 7a is a graphical illustration of the unexpected performance improvement of the controllable brake with powdered metal pole pieces as compared to prior art wrought steel pole pieces (AISI 12L14)

FIG. 7a illustrates a performance curve for brakes having the geometry similar to the MR brake 20b embodiment of FIG. 3a and compares the performance of substantially identical brakes with wrought steel pole pieces and powdered metal pole pieces. In this figure, it is readily apparent that for 1.0 amps current input to the coil assembly, the powdered metal version designated PM generates up to about 4% more torsional resistance (torque in.-lb.) as compared to wrought steel (AISI 12L14) pole pieces of the exact same geometry. This result was unexpected at the time of the making of the invention. Further, it was found that the off-state is about 55% lower and the switching speed is higher with PM pole pieces as compared to wrought pole pieces.

Figure 7B:
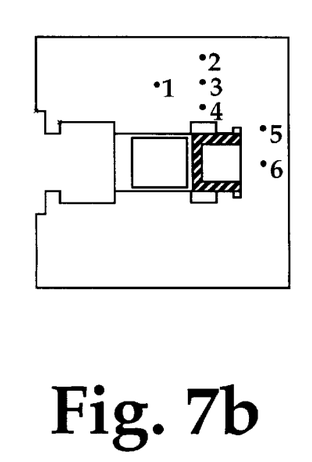
FIG. 7b is a cross-sectioned view of a portion of the pole pieces (one side of the centerline) used in a magnetic analysis, showing the points of interest 1–6.
Figure 7C:
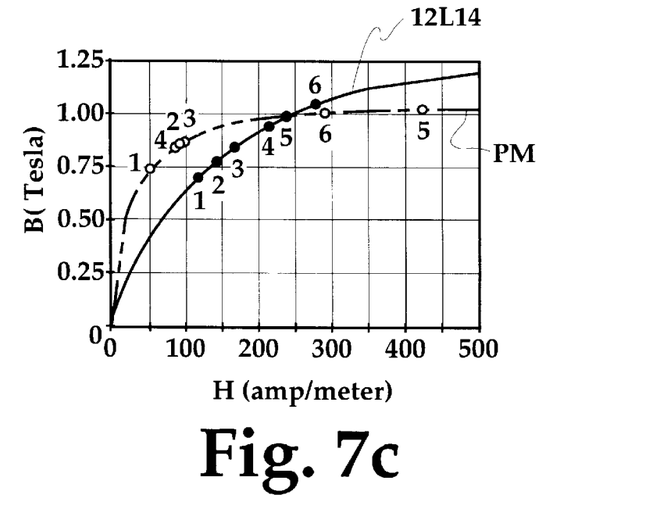
FIG. 7c is a graphical illustration of the location of each point on the B/H curve comparing wrought 12L14 with Powdered metal.

FIG. 7b and FIG. 7c illustrate a cross-sectioned portion on one side of the centerline of an MR brake used in the analysis of, and the results of the performance comparison of an MR brake similar to the MR brake 20b using 6.9 gm/cm3 pure-iron powdered metal as indicated by the designation PM as compared to an identical cross-section using wrought steel (AISI 12L14).

While the preferred embodiments of the present invention have been described in detail, various modifications, alterations, changes and adaptations to the aforementioned may be made without departing from the spirit and scope of the present invention defined in the appended claims. It is intended that all such modifications, alterations and changes be considered part of the present invention.

What is claimed is:

1. A controllable brake, comprising
   (a) a shaft,
   (b) a rotor manufactured from a highly magnetically permeable material having first and second rotor surfaces, a working portion, and an outer periphery, said rotor being interconnected to said shaft to restrain relative rotation therebetween,
   (c) a housing including a magnetically-soft yoke which is manufactured from a highly magnetically permeable powdered metal material, said magnetically-soft yoke having a recess formed therein, said recess receiving said working portion of said rotor and forming a first gap adjacent to said first rotor surface and a second gap adjacent to said second rotor surface, said housing including a portion shaped relatively thin compared to a part of the housing including the yoke, said portion formed adjacent the shaft for preventing magnetic field buildup at a shaft sealing area,
   (d) a magnetically-soft medium contained within and at least partially filling said first and second gaps, and
   (e) means for generating a changeable magnetic field adjacent to said magnetically-soft yoke, said changeable magnetic field being directed to cause said magnetically-soft medium within said first and second gaps to change rheology thereby causing a change in torsional resistance of said controllable brake when said means for generating a changeable magnetic field is energized.

2. A brake of claim 1 wherein said magnetically-soft medium is a magnetorheological fluid including magnetically-soft particles disbursed within a carrier liquid.

3. A brake of claim 1 wherein said means for generating a changeable magnetic field is a coil assembly.

4. A brake of claim 1 wherein said magnetically-soft yoke is made from a first and second half and includes axial spring bias means for ensuring intimate contact between said first and second halves.

5. A brake of claim 1 wherein said magnetically soft-yoke includes a plurality of vertically oriented and laterally spaced convection cooling fins extending from an axial surface thereof.

6. A brake of claim 1 wherein a plurality of cooling fins each of said cooling fins including a first portion which extends radially outward from a radial peripheral portion of said magnetically-soft yoke and also a second portion which extends axially outward from an axial portion of said magnetically-soft yoke.

7. A brake of claim 1 wherein rotation of said housing relative to an attachment member is restrained by one restraint member selected from a group consisting of:
  i) at least one of a plurality of cooling fins, and
  ii) a radial projection extending from said housing.

8. A controllable brake, comprising:
  (a) a shaft having an axis of rotation,
  (b) a rotor manufactured from a highly magnetically permeable material having first and second rotor surfaces and an outer periphery, wherein said rotor interconnects to said shaft such that relative rotation is restrained therebetween,
  (c) a housing which radially supports said shaft, the housing being shaped with a hollow enclosed space providing a pocket radially spaced from said axis of rotation of said shaft,
  (d) a magnetically-soft yoke manufactured from a magnetically permeable material received within said pocket, said magnetically-soft yoke further having a recess therein, said recess receiving a working portion of said rotor and forming a first gap adjacent to said first rotor surface and a second gap adjacent to said second rotor surface,
  (e) a magnetically-soft medium contained within and at least partially filling said first and second gaps, and
  (f) a coil assembly adjacent to said magnetically-soft yoke for generating a changeable magnetic field therein which is directed by said magnetically-soft yoke to cause said magnetically-soft medium within said first and second gaps to change rheology thereby causing a change in torsional resistance of said controllable brake upon electrically energizing said coil assembly.

9. A brake of claim 8 wherein said magnetically controlled medium is a magnetorheological fluid including magnetically-soft particles disbursed within a carrier liquid.

10. A brake of claim 8 wherein said magnetically-soft yoke is manufactured from a powdered metal material.

11. A brake of claim 10 wherein said powdered metal material has a density range of between about 6.4 gm/cm3 and about 7.2 gm/cm3.

12. A brake of claim 10 wherein said powdered metal material is selected from a group consisting of pure iron, low carbon iron, and iron with added phosphorous.

13. A brake of claim 8 wherein at least one spring flexibly suspends said rotor along an axial axis and maintains an axial position of said rotor relative to said housing.

14. A brake of claim 13 wherein said rotor includes a rotor projection, said housing includes a housing projection, said at least one spring includes a first face which rests against said housing projection and a second face which rests against said rotor projection.

15. A controllable brake, comprising:
  (a) a shaft,
  (b) a rotor manufactured from a highly magnetically permeable material having first and second rotor surfaces, a working portion, and an outer periphery, said rotor interconnects to said shaft restraining relative rotation therebetween,
  (c) a housing and magnetically-soft yoke combination manufactured from a magnetically permeable powdered metal material, said housing and magnetically-soft yoke combination having a recess formed therein, said recess receiving said working portion of said rotor therein and forming a first gap adjacent to said first rotor surface, and a second gap adjacent to said second rotor surface, said housing and magnetically-soft yoke combination including a thicker section at an outer radial portion adjacent to said working portion and a thinner section at an inner radial portion adjacent to said shaft,
  (d) a magnetically-soft medium including magnetically-soft particles contained in and at least partially filling said first and second gaps, and
  (e) a coil assembly adjacent to said housing and magnetically-soft yoke combination for generating a changeable magnetic field therein which is directed to cause said magnetically-soft medium within said first and second gaps to change rheology thereby causing a change in torsional resistance of said controllable brake upon electrically energizing said coil assembly.

16. A brake of claim 15 wherein said magnetically controlled medium is a magnetorheological fluid including magnetically-soft particles disbursed within a carrier liquid.

17. A brake of claim 15 further including a shaft seal for sealing around said shaft and wherein said housing and magnetically-soft yoke combination includes a magnetic saturation portion formed therein adjacent to said shaft to minimize a magnitude of said changeable magnetic field which is generated in an area adjacent to said shaft seal.

18. A brake of claim 15 wherein said housing and magnetically-soft yoke combination is manufactured from said powdered metal material having a density of between about 6.4 gm/cm3 and about 7.2 gm/cm3.

19. A brake of claim 15 wherein said powdered metal material is selected from a group consisting of pure iron, low carbon iron, and iron with added phosphorous.

20. A brake of claim 15 further including a shaft seal, wherein a noncontacting lip projection on said housing and magnetically-soft yoke combination in an area adjacent to said shaft seal provides a weak localized magnetic flux to retain some of said magnetically-soft medium between said noncontacting lip projection and said shaft.

21. A brake of claim 15 wherein at least one spring supports said rotor along an axial axis and maintains substantially equal thicknesses of said first gap and said second gap.

22. A brake of claim 15 wherein said rotor includes a rotor projection, said housing includes a housing projection, at least one spring is flexible and disc-like and includes an inner periphery which spring loads against said housing projection and an outer periphery which spring loads against said rotor projection.

23. A controllable brake, comprising:
  (a) a shaft,
  (b) a rotor manufactured from a highly magnetically permeable material having a working portion and a rotor projection, said rotor operatively coupled to said shaft to restrain relative rotation therebetween, (c) a housing including a magnetically-soft yoke and a housing projection, said magnetically-soft yoke having a recess formed therein which receives said working portion of said rotor forming at least one gap, (d) a magnetically-soft medium contained within said at least one gap, (e) means for generating a magnetic field within said magnetically-soft yoke, said magnetic field being directed to cause said magnetically-soft medium to change rheology thereby causing a change in torsional resistance of said controllable brake when said means for generating said magnetic field is energized, and (f) least one flexible disc-like spring having a first periphery which spring loads against said housing projection and a second periphery which spring loads against said rotor projection.

24. A controllable brake, comprising:

(a) a shaft, (b) a rotor manufactured from a highly magnetically permeable material having a working portion, said rotor operatively coupled to said shaft, (c) a housing including an axial pocket formed therein, (d) a magnetically-soft yoke including first and second yoke halves received in said axial pocket, said magnetically-soft yoke having a recess formed therein which receives said working portion of said rotor forming at least one gap, (e) a magnetically-soft medium contained within said at least one gap, (f) means for generating a magnetic field within said magnetically-soft yoke, said magnetic field being directed across said gap to cause said magnetically-soft medium to change rheology thereby causing a change in torsional resistance of said controllable brake when said means for generating said magnetic field is energized, and (g) axial spring bias means interactive with said housing for ensuring intimate contact between said first and second yoke halves.

\* \* \* \* \*

UNITED STATES PATENT AND TRADEMARK OFFICE
CERTIFICATE OF CORRECTION

PATENT NO. : 5,942,547
DATED : August 24, 1999
INVENTOR(S) : Gary R. Gustafson, David G. Powers, and Mark A. Wuonola It is certified that error appears in the above-identified patent and that said Letters Patent is hereby corrected as shown below:

Column 7,
Line 41, delete "-NHR$_7$" and replace with -- -NHR$^7$ --;
Line 42, delete "-NHR$_7$R$_8$" and replace with -- -NR$^7$R$^8$ --;
Line 42, delete "=CH2" and replace with -- =CH$_2$ --;
Line 61, delete "-NHR$_7$" and replace with -- -NHR$^7$ --;
Line 62, delete "-NHR$_7$R$_8$" and replace with -- -NR$^7$R$^8$ --;
Line 62, delete "=CH2" and replace with -- =CH$_2$ --;

Column 8,
Line 4, delete "and R$^{10}$";
Line 27, delete "R4" and replace with -- R$^4$ --;

Column 16,
Line 20; delete "Bis-2,5-dimethylpyrolo-2-deoxystreptamine" and replace with -- Bis-2,5-dimethylpyrrolo-2-deoxystreptamine --;

Column 24,
Line 32, delete "preferrably" and replace with -- preferably --;

Column 48,
Line 54, delete "-NHR$^7$R$^8$" and replace with -- -NR$^7$R$^8$ --;

Column 49,
Line 10, delete "-NHR$^7$R$^8$" and replace with -- -NR$^7$R$^8$ --;
Line 16, delete ",and R$^{10}$";

Signed and Sealed this

Second Day of October, 2001

Attest:

NICHOLAS P. GODICI
Attesting Officer
Acting Director of the United States Patent and Trademark Office